United States Patent
Thiam

(10) Patent No.: US 7,363,256 B2
(45) Date of Patent: Apr. 22, 2008

(54) INTERNET SALES METHOD

(76) Inventor: Talla Thiam, 12200 Heritage Park Rd., No. 274, Oklahoma City, OK (US) 73120

( * ) Notice: Subject to any disclaimer, the term of this patent is extended or adjusted under 35 U.S.C. 154(b) by 453 days.

(21) Appl. No.: 10/702,499

(22) Filed: Nov. 7, 2003

(65) Prior Publication Data
US 2005/0102190 A1    May 12, 2005

(51) Int. Cl.
*G06Q 30/00*    (2006.01)
(52) U.S. Cl. ....................................... 705/26
(58) Field of Classification Search ................ 705/26, 705/27
See application file for complete search history.

(56) References Cited

U.S. PATENT DOCUMENTS

| | | | |
|---|---|---|---|
| 6,101,484 A | * | 8/2000 | Halbert et al. ................ 705/26 |
| 6,269,343 B1 | * | 7/2001 | Pallakoff ...................... 705/26 |
| 6,466,919 B1 | | 10/2002 | Walker et al. |
| 2001/0032164 A1 | | 10/2001 | Kim |
| 2002/0107732 A1 | | 8/2002 | Boies et al. |
| 2002/0169676 A1 | | 11/2002 | Floyd |
| 2002/0169679 A1 | | 11/2002 | Neumayer |

FOREIGN PATENT DOCUMENTS

KR    2003056128 A    *    7/2003

OTHER PUBLICATIONS

No Author, The World's Biggest Buy-Cycle Ever! (And What a Deal!), PR Newswire, Dec. 6, 1999. Retrieved from Dialog File: 16, Acc#: 06850631.*

* cited by examiner

*Primary Examiner*—Naeem Haq
(74) *Attorney, Agent, or Firm*—Stephen R. Greiner

(57) ABSTRACT

A method for selling consumer goods on the Internet. The method involves the establishment of a website wherein goods are advertised for sale. The terms of sale are variable such that a buyer is expected to pay a premium for faster delivery of the selected goods. Additionally, sales are not consummated until a set number of buyers agree to receive their goods at one of the published price points. If not enough buyers agree to purchase at a published price point, then all buyers will be pooled together and a sale will be consummated at the lowest price point for which the predetermined number of buyers is reached. If the predetermined number of buyers cannot be reached by pooling all buyers together, then the sale will be cancelled. Money to consummate the sale will be transmitted directly from the buyer to the manufacturer of the sold goods. The manufacturer pays to the operator of the website a fee that is dependent on the sales of the goods that are made.

1 Claim, 1 Drawing Sheet

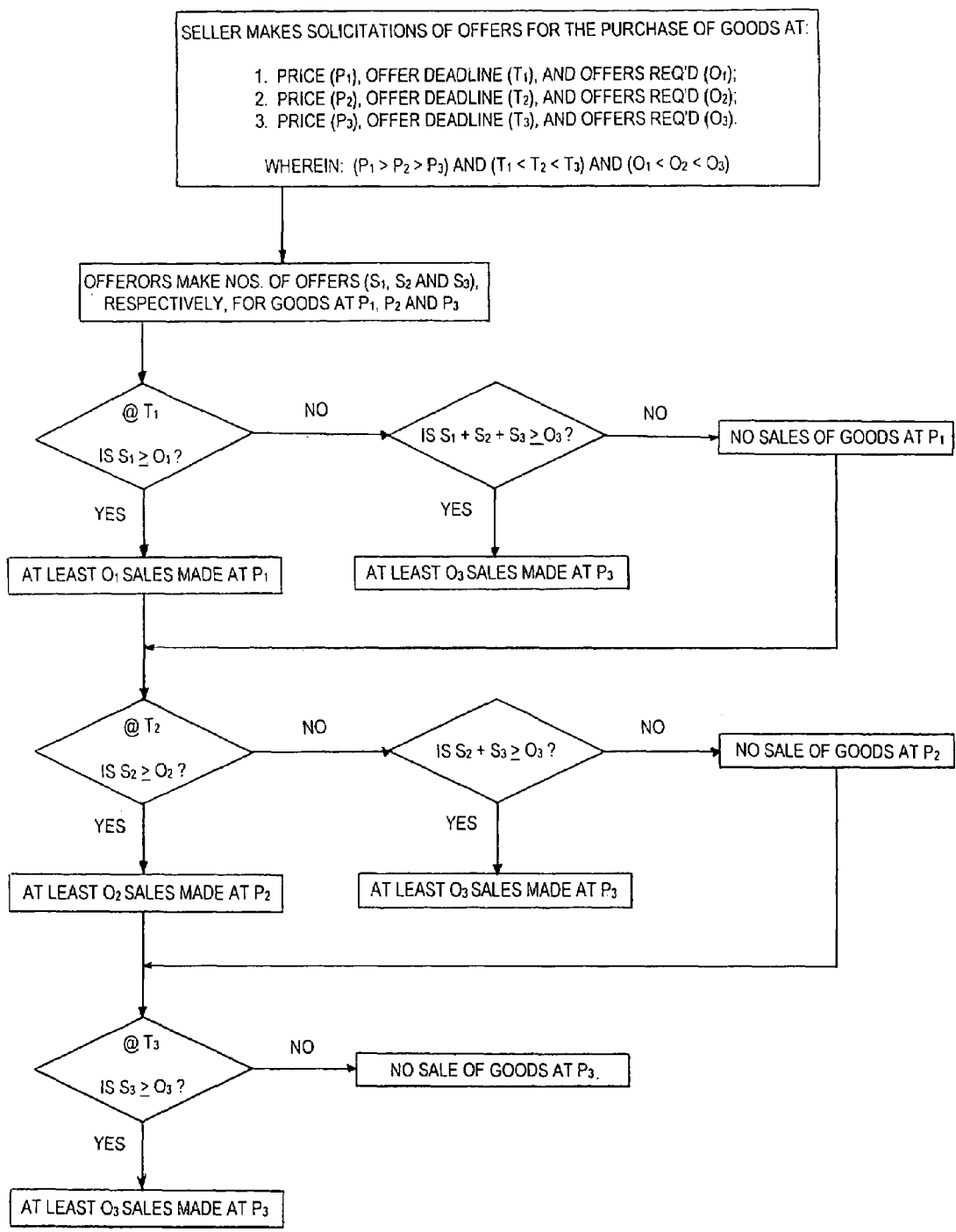

INTERNET SALES METHOD

FIELD OF THE INVENTION

The present invention relates generally to business methods and, more particularly, to a method for pooling or aggregating sales contracts to achieve efficiencies of scale.

BACKGROUND OF THE INVENTION

The purchase of goods over the Internet has become a way of modern life. Over the past few years thousands of websites have sprung up to peddle goods of every conceivable sort. With a good search engine, an individual can find practically any one of these websites. Findings or generating a good deal is a different matter.

In the "bricks and mortar world," big-box retailers such as Sam's Club and Wal-Mart can purchase goods in huge quantities and offer great deals to their shoppers. Over the Internet, however, savings are generated primarily by reducing the personnel required to generate a particular sale. Examples of these latter sorts of businesses include eBay and Amazon.com. A need, therefore, exists for a method of doing business over the Internet that can provide goods to buyers within reasonable periods of time and a low cost by simultaneously aggregating willing buyers together and limiting the number of personnel required to tend to such buyers.

SUMMARY OF THE INVENTION

In light of the problems associated with the known manner for selling goods on the Internet, it is a principal object of the invention to provide a method for aggregating or pooling Internet purchasers so that goods can be sold in large quantities rather than single units so as to afford efficiencies of scale. Buyers obtain goods at low cost by trading off immediate delivery of the goods for a brief delay. Sellers obtain efficiencies of scale and, ultimately, higher profits by being able to fill a predetermined number of sales orders at a scheduled time rather than handling such sales piecemeal.

It is an object of the invention to provide improved steps and arrangements thereof in an Internet sales method for the purposes described that is inexpensive to perform and fully dependable in use.

Briefly, the Internet sales method in accordance with this invention achieves the intended objects by requiring the establishment of a website wherein goods are advertised for sale. The terms of sale are variable such that a buyer pays a premium for faster delivery of the selected goods. Additionally, sales are not consummated until a set number of buyers agree to receive their goods at one of several different price points. If not enough buyers agree to purchase at a published price point, then all buyers will be pooled together and a sale will be consummated at the lowest price point for which the predetermined number of buyers is reached. If the predetermined number of buyers cannot be reached by pooling all buyers together, then the sale will be cancelled. Money to consummate the sale will be transmitted directly from the buyer to the seller/manufacturer of the sold goods. The manufacturer pays to the operator of the website a fee that is dependent on the sales of the goods that are made.

The foregoing and other objects, features, method steps and advantages of the present invention will become readily apparent upon further review of the following detailed description of the preferred embodiment of as illustrated in the accompanying drawing.

BRIEF DESCRIPTION OF THE DRAWING

The present invention may be more readily described with reference to the accompanying drawing that is a schematic representation of the operation of the Internet sales method in accordance with the present invention.

DETAILED DESCRIPTION OF THE PREFERRED METHOD

Referring now to the figure, a method for selling goods on the Internet is shown schematically. The method involves the establishment of a website wherein a seller solicits offers for goods from prospective buyers. Each of the solicitations has associated with it: a sales price ($P_x$), a period within which offers for the purchase of goods at the sales price will be accepted ($T_x$), and a minimum number of offers for the purchase of goods at the sales price that must be made before any offers will be accepted ($O_x$). Offers are made and accepted in a prescribed way.

At the outset, a seller will make multiple, simultaneous solicitations of offers for the purchase of fungible goods like televisions or personal computers. For example, goods might be sold at a high price ($P_1$) of $100/good if a low number of offers ($O_1$), say, 50 are received within a short solicitation period ($T_1$) of, say, 3 days. Further, the same goods might be sold at a low price ($P_3$) of $80/good if a high number of offers ($O_3$), say, 200 are received within a long solicitation period ($T_3$) of, perhaps, 14 days. Finally, the goods might be sold at an intermediate price ($P_2$) of $90/good if an intermediate number of offers ($O_2$), say, 100 are received within an intermediate solicitation period ($T_2$) of, maybe, 7 days.

At the close of short solicitation period ($T_1$), there may be a number of offers received by the seller for goods at price ($P_1$) that is greater than the number ($O_1$) required to complete sales. In the event that a sufficient number of offers ($O_1$) is received, sales of the offered goods will be made at price ($P_1$) as described below. The solicitations for goods at relatively lower prices ($P_2$ and $P_3$) but longer waiting periods ($T_2$ and $T_3$) will proceed without interruption by the sales at high price ($P_1$).

If the number of offers received by the end of short solicitation period ($T_1$) is less than the number of offers ($O_1$) required by the seller, then the seller will combine the offers made for the goods at the high, intermediate, and low prices ($P_1$, $P_2$ and $P_3$) to determine whether a sufficient number of offers ($O_3$) has been made to satisfy the terms of the low price ($P_3$) sale.

If the combined number of offers received is greater than ($O_3$), then sales of the offered goods will be immediately completed with all offerors at price ($P_3$) as described below and no additional offers will be accepted for any goods. However, if the combined number of offers received is less than the high number of offers ($O_3$), then no sales of goods at price ($P_1$), or at any other price ($P_2$) or ($P_3$), will be immediately made. In the alternative, solicitations for goods at other prices ($P_2$) and ($P_3$) will proceed for longer periods ($T_2$) and ($T_3$).

At the close of intermediate solicitation period ($T_2$) there may be a number of offers received by the seller for goods at price ($P_2$) that is greater than the required number ($O_2$). In this situation, sales of the offered goods will be made at price ($P_2$) as described below. The solicitations for goods at a relatively lower price ($P_3$) but longer waiting period ($T_3$) will proceed without interruption by the sales at intermediate price ($P_2$).

If the number of offers received by the end of intermediate solicitation period ($T_2$) is less than the required, intermediate number of offers ($O_2$), then the seller will combine the offers made for the goods at the intermediate and low prices ($P_2$) and ($P_3$) to determine whether a sufficient number of offers ($O_3$) has been made to satisfy the terms of the low price ($P_3$) sale. If the combined number of offers is greater than high number ($O_3$), then sales of the goods will be immediately made to all offerors at price ($P_3$) as described below and no additional offers will be accepted. However, if the combined number of offers received is less than the high number ($O_3$), then no sales of goods at prices ($P_2$) or ($P_3$) will be immediately made. Now, only solicitations for goods at low price ($P_3$) will proceed for the long solicitation period ($T_3$).

At the close of long solicitation period ($T_3$) there may be a number of offers received by the seller for goods at price ($P_3$) that is greater than the required, high number ($O_3$). In this event, sales of the offered goods will be made at price ($P_3$) as described below. However, if the number of offers received is less than the required number ($O_3$), then no sales of goods at price ($P_3$) will be made.

The sales of goods at the prices ($P_1$, $P_2$ and $P_3$) determined by the seller are all completed via the Internet in a simple manner. To do this, the offeror must provide a credit card number to the seller who will receive payment from the offeror's credit card company in the usual way. To expedite handling of these transactions, and to show the good faith of the offeror in entering into a contract for the purchase of goods, the credit card number will be required at the time that the offer for the purchase of goods is made, i.e., sometime prior to the time for the close of solicitations ($T_1$, $T_2$ or $T_3$). Upon providing a credit card number to the seller, the offeror agrees to purchase goods for a price no greater than the offered price ($P_1$, $P_2$ or $P_3$). The offeror may also agree to pay a nominal shipping charge for the goods that is set in advance and advertised by the seller that may or may not form a part of the offered price for the goods ($P_1$, $P_2$ or $P_3$).

Upon receiving payment of the requisite amount ($P_1$, $P_2$ or $P_3$) from the credit card company, seller will fill at least the corresponding number of orders ($O_1$, $O_2$ or $O_3$) published during with the Internet solicitation made by the seller. If sufficient goods are on hand, the seller may choose to complete sales contracts with the offerors on a first come-first served basis.

Should the seller not be the manufacturer of the goods offered for sale and serve merely as a broker of the goods or agent of the manufacturer, the seller may wish to charge an override ($F_1$) on each sales contract generated by its efforts. Such an override can take the form of a percentage of the price ($P_1$, $P_2$ and $P_3$) of the goods sold by the manufacturer and can vary. For example, an override ($F_1$) can be set at a high level, say, 10% for goods sold at high price ($P_1$) and can be set at a low level ($F_3$) of about 5% for goods sold at low price ($P_3$). For goods sold at intermediate price ($P_2$), the override can be set at an intermediate level of, perhaps, 7.5%.

From the foregoing, it should be appreciated that the inventive method is straightforward and easy to carry out. An offeror who requires goods in a hurry pays a premium to the seller for the expedite handling of this contract. However, an offeror who is in no great rush can generate significant savings. Similarly, a seller can experience great efficiencies a scale by producing large aggregates or pools of similar sales. All benefit.

While the invention has been described with a high degree of particularity, it will be appreciated by those skilled in the art that modifications may be made thereto. For example, any number of simultaneous solicitations for offers for the purchase of goods can be made by a seller —there need not be three as described herein. Further, the method need not be limited to the sales of goods but could encompass the sales of any and all things including services of various sorts. Therefore, it is to be understood that the present invention is not limited to the sole method described above, but encompasses any and all methods within the scope of the following claims.

I claim:

1. A sales method, comprising the steps of:

simultaneously publishing a pair of solicitations of offers by a seller for the purchase of things, a first one of said solicitations having associated therewith: a first price for the things, a first deadline for the receipt of the offers, and a first number of offers required to complete a sale, the second one of said solicitations having associated therewith: a second price for the things that is less than said first price, a second deadline for the receipt of the offers which is further in the future than said first deadline, and a second number of offers that is required to complete a sale; and receiving a number of first purchase offers and a number of second purchase offers from one or more offerors, each of said first purchase offers corresponding to the terms of the first one of said solicitations and each of said second purchase offers corresponding to the second one of said solicitations; and comparing the number of first purchase offers with said first number of offers required to complete a sale at said first deadline;

if said number of first purchase offers is greater than or equal to said first number of offers required to complete a sale, then consummating sales at said first price between the seller and the first offerors to produce said first number of offers required to complete a sale at said first deadline; and if said number of first purchase offers is less than said first number of offers required to complete a sale, then combining the numbers of said first purchase offers and said second purchase offers together;

comparing the combined number of said first purchase offers and said second purchase with said second number of offers required to complete a sale at said second deadline; and determining that the combined number of said first purchase offers and said second purchase offers is greater than or equal to said second number of offers required to complete a sale at said second deadline, then consummating sales at said second price between the seller and the first and second offerors to produce said second number of offers required to complete a sale.

* * * * *